(No Model.)
J. TORS.
SAW HANDLE.
No. 536,822. Patented Apr. 2, 1895.
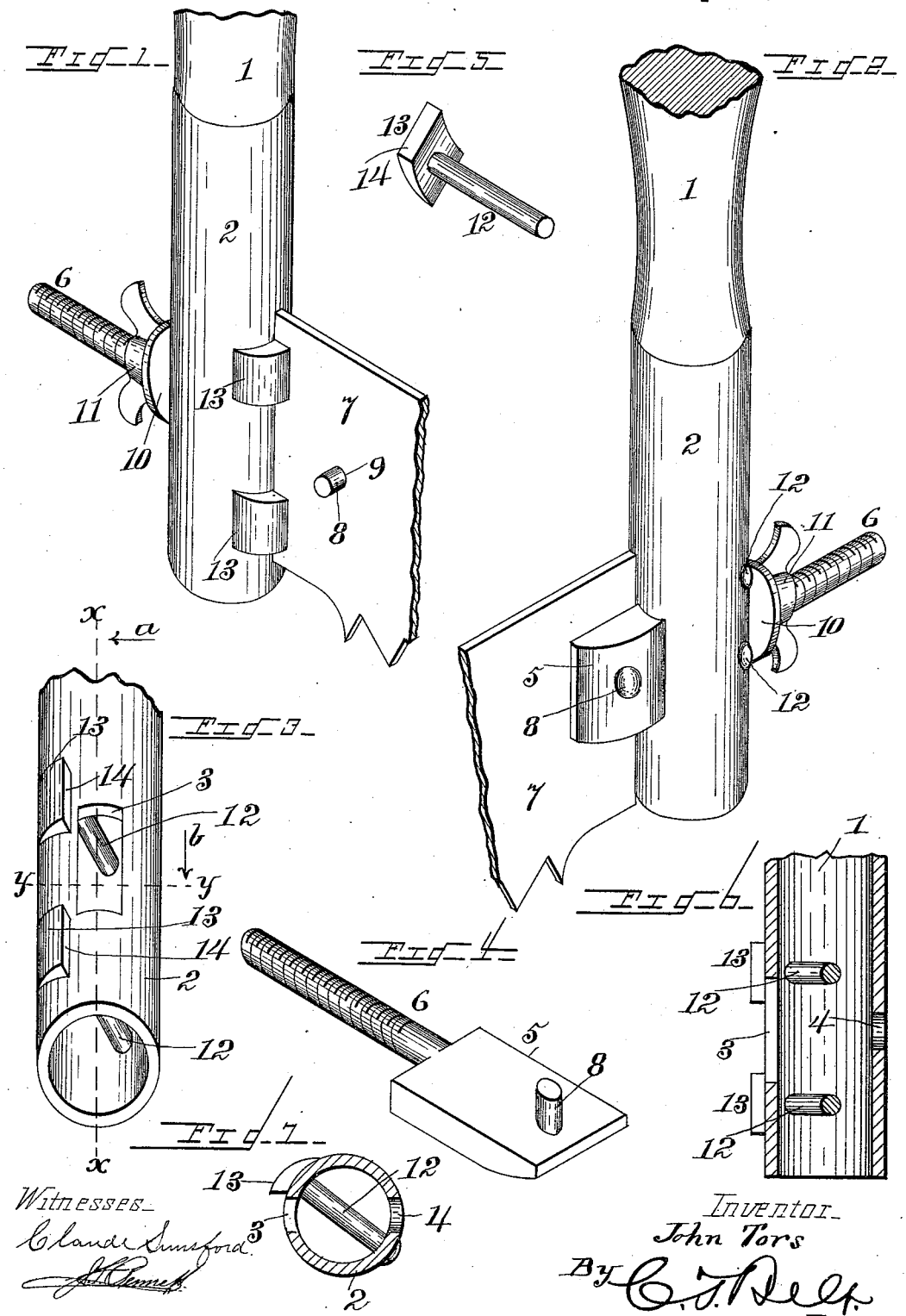
Witnesses
Claude Lunsford
Inventor
John Tors
By C. J. Belt
Atty.

UNITED STATES PATENT OFFICE.

JOHN TORS, OF FORT BRAGG, CALIFORNIA.

SAW-HANDLE.

SPECIFICATION forming part of Letters Patent No. 536,822, dated April 2, 1895.

Application filed January 5, 1895. Serial No. 533,954. (No model.)

*To all whom it may concern:*

Be it known that I, JOHN TORS, a citizen of the United States, residing at Fort Bragg, in the county of Mendocino and State of California, have invented certain new and useful Improvements in Saw-Handles, of which the following is a specification.

This invention relates to the class of wood working tools and particularly to a hand saw handle.

The novelty of the invention will be fully understood from the following description and claim when taken in connection with the annexed drawings, and the object of the invention is to provide a saw handle of simple, cheap and durable construction.

A further object of the invention is to provide a detachable handle for cross cut saws which can be attached and adjusted to a saw of any size.

A still further object of the invention is to provide means for attaching and adjusting the handle firmly in position on a cross cut saw.

The invention consists in the novel construction and arrangements of parts, as will be hereinafter more fully described and set up in the claim.

In the accompanying drawings forming part of this application: Figure 1 is a perspective view of part of a cross cut saw having my handle, partly broken away, secured thereto. Fig. 2 is a similar view showing the opposite side of the saw to that shown in Fig 1. Fig. 3 is a perspective view of the metallic tube or barrel, partly broken away. Fig. 4 is an enlarged perspective view of the coupling screw. Fig. 5 is a perspective view of one of the rivets having an arc shaped head. Fig. 6 is a vertical section of the thimble or barrel, partly broken away taken on the line *x—x* Fig. 3, looking in the direction indicated by the arrow *a*. Fig 7 is a cross section taken on the line *y—y* of Fig. 3, looking in the direction indicated by the arrow *b*.

The same reference numerals denote the same parts throughout the several figures of the drawings.

The hand grasping portion 1, or the handle proper, is of wood in the usual shape, while the remaining parts of the device are all made preferably of wrought iron. The said wooden portion 1, is driven into the tube, thimble or barrel 2, so that the two are joined firmly together, or they may be made all in one piece of metal if desired.

The thimble, or barrel 2, has a slot 3, and an aperture 4, directly opposite, and in the same plane with the center of the slot 3, and through said slot the jaw 5, of the coupling screw 6 is operated; while the said screw is operated through the aperture 4. This jaw 5, has upon its face, which comes in contact with the saw 7, a pin or projection 8, which engages an aperture 9, in the saw, and by means of a washer 10, and thumb screw 11, upon the coupling screw 6, the saw is attached to the thimble. This connecting, coupling or attaching device, is adapted to be used in connection with a saw of any size, or a saw having the aperture 9, at a greater or less distance from the end.

In order to prevent the saw slipping off the pin 8, or moving laterally, the thimble is provided with rivets 12, which pass through the thimble at an angle to the slot 3, and aperture 4, and are secured in position by having one end upset or riveted. The other end is provided with an arc shaped head 13, located adjacent to the slot 3, upon the outside of the thimble, and having a bearing face 14, for the saw, so that the saw when in position, is firmly clamped between the coupling screw jaw 5, and the rivet heads 13.

It will be observed that the face of the coupling screw jaw is flush with the said screw, and that it is of sufficient length to always engage the slot 3, so that there is no vertical movement of the saw permitted.

It will be further observed that by constructing the parts of wrought iron, should any of them become broken or worn, they may be readily replaced without dispensing with or impairing the usefulness of the handle.

Having thus described my invention, what I claim as new, and desire to secure by Letters Patent, is—

The saw handle, the tube having a slot and an aperture formed in the same plane, the rivets extending through the tube, at an angle to the slot and aperture, and having arc shaped heads adjacent to the slot upon the outside of the tube, which are engaged by one side of the saw, the coupling screw having a jaw located in the said slot and engaging the other or opposite side of the saw, the face of the jaw having a pin extending through the saw, and the thumb screw for securing the parts together, substantially as set forth.

In witness whereof I hereunto set my hand in the presence of two witnesses.

JOHN TORS.

Witnesses:
ALEX. LEDERSTROM,
EDVARD WELLBACKA.